US012617917B2

(12) United States Patent
Lewczyk et al.

(10) Patent No.: US 12,617,917 B2
(45) Date of Patent: May 5, 2026

(54) BIODEGRADABLE FOAM WITH ALGINATE

(71) Applicant: Cruz Foam, Inc., Santa Cruz, CA (US)

(72) Inventors: William Thomas Lewczyk, Santa Cruz, CA (US); Grant Scott Logan, Paradise Valley, AZ (US)

(73) Assignee: Cruz Foam, Inc., Santa Cruz, CA (US)

( * ) Notice: Subject to any disclaimer, the term of this patent is extended or adjusted under 35 U.S.C. 154(b) by 728 days.

(21) Appl. No.: 17/959,839

(22) Filed: Oct. 4, 2022

(65) Prior Publication Data

US 2023/0104197 A1 Apr. 6, 2023

Related U.S. Application Data

(60) Provisional application No. 63/251,834, filed on Oct. 4, 2021.

(51) Int. Cl.
*C08J 9/00* (2006.01)
*C08J 9/08* (2006.01)

(52) U.S. Cl.
CPC ............. *C08J 9/08* (2013.01); *C08J 2201/03* (2013.01); *C08J 2203/02* (2013.01); *C08J 2305/08* (2013.01); *C08J 2405/04* (2013.01)

(58) Field of Classification Search
CPC ...... C08J 9/08; C08J 2201/03; C08J 2203/02; C08J 2305/08; C08J 2405/04
USPC ........................................ 106/122
See application file for complete search history.

(56) References Cited

U.S. PATENT DOCUMENTS

| | | | |
|---|---|---|---|
| 5,011,864 A | 4/1991 | Nielsen et al. |
| 5,256,702 A | 10/1993 | Grigat et al. |
| 5,756,111 A | 5/1998 | Yoshikawa et al. |
| 5,851,461 A | 12/1998 | Bakis et al. |
| 7,041,369 B1 | 5/2006 | Mackey et al. |
| 8,114,919 B2 | 2/2012 | Weidinger |
| 2001/0014702 A1 | 8/2001 | Harfmann et al. |
| 2003/0021921 A1 | 1/2003 | Debraal et al. |

(Continued)

FOREIGN PATENT DOCUMENTS

| | | |
|---|---|---|
| CN | 1112143 A | 11/1995 |
| CN | 1410452 A | 4/2003 |

(Continued)

OTHER PUBLICATIONS

Invitation to Pay Additional Fees and, Where Applicable, Protest Fee, mailed Dec. 14, 2022, in corresponding International Application No. PCT/US2022/77529, 2 pages.

(Continued)

*Primary Examiner* — James E Mcdonough

(74) *Attorney, Agent, or Firm* — Christensen O'Connor Johnson Kindness PLLC

(57) ABSTRACT

A foam is described. The foam comprising a polymer matrix including at least one of chitin, chitosan, or chitosan oligosaccharide. The polymer matrix is porous. The foam further comprising alginate. The foam has a density of less than 1 g/cm³. A method of making foam is described. The method comprising dissolving at least one of chitin, chitosan, or chitosan oligosaccharide in a first solution, dissolving alginate in a second solution that is alkaline and separate from the first solution, mixing the first solution and the second solution together to form a foam precursor, and drying the foam precursor to form the foam.

19 Claims, 6 Drawing Sheets

(56) References Cited

U.S. PATENT DOCUMENTS

| | | | |
|---|---|---|---|
| 2003/0143388 A1 | 7/2003 | Reeves et al. | |
| 2003/0155679 A1 | 8/2003 | Reeves et al. | |
| 2004/0197545 A1 | 10/2004 | Gehlsen et al. | |
| 2005/0202229 A1 | 9/2005 | Ozasa et al. | |
| 2006/0293418 A1 | 12/2006 | Matuana et al. | |
| 2007/0292643 A1 | 12/2007 | Renn | |
| 2008/0033392 A1* | 2/2008 | Gaserod | A61P 41/00 |
| | | | 426/534 |
| 2009/0214853 A1 | 8/2009 | Quist et al. | |
| 2009/0263601 A1 | 10/2009 | Renn | |
| 2011/0059162 A1 | 3/2011 | Reed et al. | |
| 2012/0077012 A1 | 3/2012 | Liu et al. | |
| 2013/0287836 A1 | 10/2013 | Ingber et al. | |
| 2014/0256925 A1 | 9/2014 | Catchmark et al. | |
| 2015/0057368 A1 | 2/2015 | Connelly et al. | |
| 2015/0299383 A1 | 10/2015 | Trumbo et al. | |
| 2015/0374877 A1 | 12/2015 | Guo et al. | |
| 2016/0168311 A1 | 6/2016 | Cuero Rengifo et al. | |
| 2016/0207251 A1 | 7/2016 | Cik | |
| 2019/0167837 A1 | 6/2019 | Datt et al. | |
| 2020/0139002 A1 | 5/2020 | Dudnyk et al. | |
| 2020/0239670 A1 | 7/2020 | Rolandi et al. | |
| 2021/0238393 A1* | 8/2021 | Zhang | C08K 11/00 |

FOREIGN PATENT DOCUMENTS

| | | | |
|---|---|---|---|
| CN | 1628865 A | 6/2005 | |
| CN | 1800249 A | 7/2006 | |
| CN | 101381500 A | 3/2009 | |
| CN | 101974189 A | 2/2011 | |
| CN | 101654537 B | 3/2011 | |
| CN | 101301491 B | 6/2011 | |
| CN | 103012836 A | 4/2013 | |
| CN | 103709452 A | 4/2014 | |
| CN | 104558677 A | 4/2015 | |
| EP | 0747420 A1 | 12/1996 | |
| EP | 3487922 A1 | 5/2019 | |
| EP | 3794068 A1 | 3/2021 | |
| KR | 960004436 B1 | 6/1993 | |
| WO | 2012030805 A2 | 3/2012 | |
| WO | 2013131079 A1 | 9/2013 | |
| WO | 2018017837 A1 | 1/2018 | |
| WO | 2019217268 A1 | 11/2019 | |

OTHER PUBLICATIONS

Emilia Szymańska, et al., Stability of Chitosan—A Challenge for Pharmaceutical and Biomedical Applications, Marine Drugs, Published Apr. 1, 2015, vol. 13, pp. 1819-1846.

Duan, Natural Macromolecules (Chinese), Huazhong University of Science and Technology Press, Edition 1, p. 192, Mar. 31, 2016.

Beijing Plastic Industry School, China Light Industry Press, Plastic Molding Equipment 1st Addition, Aug. 31, 2007, pp. 1-4 (pp. 115-116).

ASTM Int'l Standard Designation: D1621-10, Standard Test Method for Compressive Properties of Rigid Cellular Plastics, Apr. 2010, 5 pages.

ASTM Int'l Standard Designation: D1622/D1622M-14, Standard Test Method for Apparent Density of Rigid Cellular Plastics, Apr. 2014, 4 pages.

ASTM Int'l Standard Designation: D1623-09, Standard Test Method for Tensile and Tensile Adhesion Properties of Rigid Cellular Plastics, Sep. 2009, 7 pages.

ASTM Int'l Standard Designation: D3575-20, Standard Test Methods for Flexible Cellular Materials Made from Olegin Polymers, Feb. 2020, 11 pages.

ASTM Int'l Standard Designation: D3576-15, Standard Test Method for Cell Size of Rigid Cellular Plastics, Oct. 2015, 5 pages.

ASTM Int'l Standard Designation: D6226-15, Standard Test Method for Open Cell Content of Rigid Cellular Plastics, Sep. 2015, 7 pages.

Banerjee et al., Alginate-chitosan composite hydrogel film with macrovoids in the inner layer of biomedical applications, J. Appl. Polym. Sci., Jun. 10, 2019, 9 pages.

Calles-Arriaga et al., Thermal characterization of microwave assisted foaming of expandable polystyrene, Ingenieria investigacion y tecnologia, Jan. 2016, 7 pages.

Castel-Molieres et al., Influence of Homogenization Technique and Blend Ratio on Chitosan/Aliginate Polyelectrolyte Complex Properties, Journal of Medicine and Biological Engineering, v. 38(1); Feb. 2018, pp. 10-21.

Flagel, Mycelium: Using Mushrooms to Make Packaging Materials, https://matmatch.com/blog, Apr. 3, 2020, 21 pages.

Makarios-Laham et al., Biodegradability of chitin- and chitosan-containing films in soil environment, J. Environ Polym Degr 3, (1), Jan. 1995, 6 pages.

Mohandas et al., Exploration of alginate hydrogel/nano zinc oxide composite bandages for infected wounds, International Journal of Nanomedicine Oct. 1, 2015, pp. 53-66.

Li et al., Chitosan-Alginate Nanoparticles as a Novel Drug Delivery System for Nifedipine, International Journal of Biomedical Science, vol. 4, No. 3, Sep. 2008, pp. 221-228.

Shigemasa et al., Evaluation of different absorbance ratios from infrared spectroscopy for analyzing the degree of deacetylation in chitin, International Journal of Biological Macromolecules, 18(3) Apr. 1, 1996, 237-42.

Zhao et al., Preparation of Fibrous Chitosan/Sodium Alginate Composite Foams for the Absorption of Cationic and Anionic Dyes, Journal of Hazardous Materials vol. 403, Sep. 22, 2020, pp. 1-10.

International Search Report and Written Opinion, mailed Feb. 14, 2023, in corresponding International Patent Application No. PCT/US2022/77529, 10 pages.

* cited by examiner

BIODEGRADABLE FOAM WITH ALGINATE

CROSS-REFERENCE TO RELATED APPLICATION

This application claims the benefit of U.S. Provisional Application No. 63/251,834, filed on Oct. 4, 2021, which is hereby incorporated by reference in its entirety.

TECHNICAL FIELD

This disclosure relates generally to foam manufacturing and products, and in particular but not exclusively, relates to biodegradable foam manufacturing.

BACKGROUND INFORMATION

Plastic pollution is hazardous to life on earth. Plastic may take hundreds of years to degrade, may be ingested by animals and humans, and may cause health problems such as cancer. Plastic foams (e.g., expanded polystyrene) are ubiquitously used as packaging materials and significantly contribute to environmental plastic pollution.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

FIG. 2 illustrates chemical compositions of various ingredients that may be utilized to form a biodegradable foam, in accordance with embodiments of the present disclosure.

DETAILED DESCRIPTION

Figure 1:
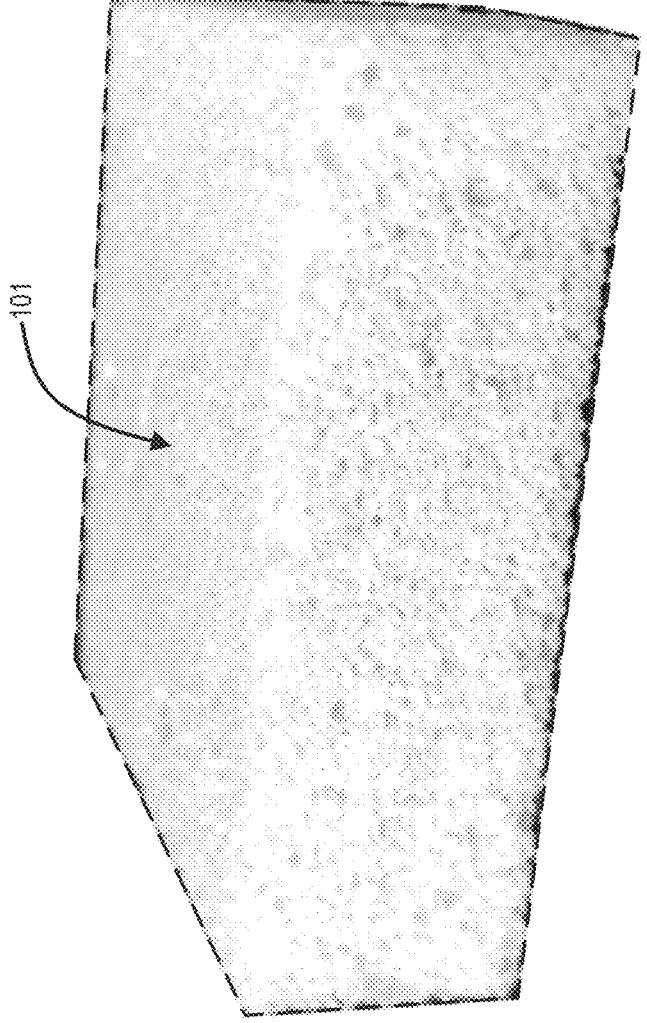
FIG. 1 illustrates an example biodegradable foam with alginate produced using the ingredients and methods described herein, in accordance with embodiments of the present disclosure.

Set forth herein are non-toxic biodegradable foam with alginate and methods of producing the biodegradable foam that solve the problems associated with conventional plastics and plastic foams. In the following description, numerous specific details are set forth to provide a thorough understanding of the embodiments. One skilled in the relevant art will recognize, however, that the techniques described herein can be practiced without one or more of the specific details, or with other methods, components, materials, etc.

In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

Inorganic plastics and plastic foams are ubiquitous. Expanded polystyrene is regularly used as a packaging material. However, inorganic plastics and plastic foams have become a major environmental pollutant, do not biodegrade, use toxic non-renewable precursors, and may cause health problems such as cancer.

Described herein are precursors and methods of manufacturing which may be used to make biodegradable nontoxic polymers and polymer foams. Petroleum-based foams suffer from many drawbacks. The foams described herein are biodegradable, nontoxic, and produced with nontoxic precursors and through environmentally friendly processes. As will be shown, these biodegradable foams represent a significant advancement over existing industrial foam technologies since the biodegradable foams have similar or better mechanical, chemical, and thermal properties than the petroleum-based foams, with none of the negative environmental impact.

The nontoxic polymers and polymer foams described herein may use renewable precursors and do biodegrade. Thus, the polymers (e.g., foam, and/or products made from the foam) and methods of manufacturing described in embodiments disclosed herein may solve at least some of the problems associated with conventional inorganic plastic foams and foam-based products. In particular, embodiments disclosed herein incorporate biodegradable foams formed with alginate (e.g., alginic acid, sodium alginate, calcium alginate, or the like) in a biodegradable form and at least one of chitosan, chitin, or chitosan oligosaccharide. It has been found that the alginate reacts with the at least one of chitosan, chitin, or chitosan oligosaccharide within the foam and forms stronger bonds. Accordingly, in some embodiments, a quantity of alginate included in precursors for forming the foam (e.g., solutions or mixtures) may be tuned to configure the material properties of the foam as desired (e.g., increase or decrease compressive strength, tensile strength, or other mechanical properties associated with the stress/strain relationship attributed to the interaction between the alginate and components of the foam).

FIG. 1 illustrates a view 100 of an example biodegradable foam 101 with alginate produced using the ingredients and methods described herein, in accordance with embodiments of the present disclosure. In some embodiments, the foam has a low density (e.g., less than 1 g/cm$^3$, less than 0.5 g/cm$^3$, less than 0.3 g/cm$^3$, or less than 0.1 g/cm$^3$) due to most volume of the foam corresponding to air. It is appreciated that the foam 101 may be non-toxic and/or biodegradable materials to form comparable non-toxic and/or biodegradable products. The foam 101 may include any of chitosan, chitosan oligosaccharide, chitin, and alginate (e.g., alginic acid, sodium alginate, calcium alginate, or the like). When foam 101 includes multiple constituent components it may be referred to as a composite (e.g., a material made from two or more constituent materials). However, it is not required that foam 101 include other ingredients. The foam 101 may include a polymer matrix (e.g., from chitosan, chitosan oligosaccharide, or chitin) including monomer units of D-glucosamine and N-acetyl-D-glucosamine. In the depicted embodiment, the polymer matrix may include 70% or less N-acetyl-D-glucosamine. However, in other embodiments the polymer matrix may include 60% or less N-acetyl-D-glucosamine, 50% or less N-acetyl-D-glucosamine; 40% or less N-acetyl-D-glucosamine, 30% or less N-acetyl-D-glucosamine, 20% or less N-acetyl-D-glucosamine, or 10% or less N-acetyl-D-glucosamine. In some embodiments, a composition of the foam, by weight percent, includes a polymer matrix weight percent representative of the polymer matrix included in the foam and an alginate weight percent representative of the alginate included in the foam. In some embodiments, the polymer weight percent is greater than the alginate weight percent. In some embodiments, the polymer matrix weight percent may correspond to or otherwise include at least one of a chitin weight percent or a chitosan weight percent (e.g., if the polymer matrix includes chitosan but not chitin, then the polymer matrix weight percent corresponds to the chitosan weight percent). In the same or other embodiments, the chitosan weight percent is greater than the alginate weight percent. In some embodiments, the chitin weight percent is greater than the alginate weight percent. In some embodiments, a ratio of the alginate to the chitosan included in the foam ranges from 1 part alginate to 20 parts chitosan to one part alginate to 5 parts chitosan, which may be tuned or otherwise adjusted depending on a targeted strength of the foam 101.

In some embodiments, the foam 101 may include a dispersed phase disposed or otherwise intermixed within the polymer matrix to form the foam 101, which may be a porous composite foam. In some embodiments, the composition of the foam 101 includes a dispersed phase weight percent representative of a dispersed phase included in the foam 101. In one embodiment, the polymer matrix weight percent and/or chitin or chitosan weight percentages are less than the dispersed phase weight percent. In some embodiments, the polymer matrix weight percent is between 0.5-3 times that of the dispersed phase weight percent. In other words, in some embodiments, the weight percent of the polymer matrix or the constituent components of the polymer matrix (e.g., chitosan weight percent, chitin weight percent, or the like) may be greater than or less than the dispersed phase weight percent. In the same or other embodiments, the foam 101 has a density of less than 1 g/cm³. In some embodiments, a ratio of about 0.5 to 2.5 of the dispersed phase weight percent to the polymer matrix weight percent is utilized. It is appreciated that in general the ratio should be at a level effective to maintain structural integrity of the foam 101 provided by the polymer matrix. In other words, insufficient amounts of the polymer matrix may have detrimental effects on the mechanical properties of the foam 101.

In some embodiments, the dispersed phase includes at least one of chitin, starch, or cellulose. More specifically, ingredients for the dispersed phase may include at least one of (unprocessed or minimally processed) shellfish shells, wood flour, hemp, paper pulp (e.g., including broken down recycled paper), coconut husks, cornstarch, pea starch, tapioca powder, or the like. It is appreciated that the foam 101 has been made with all of the aforementioned dispersed phases, and that the ingredients for the dispersed phases are not mutually exclusive (e.g., the listed ingredients for the dispersed phase can be used individually and in combination). For example, the dispersed phase mentioned above may include all of the ingredients listed, which may each be included in the foam 101. In other embodiments, the foam 101 may include some or even only one of the listed ingredients for the dispersed phase.

It is appreciated that foams (e.g., the foam 101) made from chitosan, chitosan oligosaccharide, and chitin are biodegradable and have none of the toxic qualities of petroleum-based foams. The discovery of adding a chitosan-compatible dispersed phase to the foam 101 is a significant advancement in biodegradable foam technology because the properties of the foam can be tuned for a variety of applications. One can tune the pore size for example, by using a closed-mold during heating and changing the pressure inside the mold. By increasing the internal pressure, foams with smaller pore sizes can result. One can tune the density of the foam for example, by changing the dispersed phase weight percent and the amount of a blowing agent (less dispersed phase material and more blowing agent results in a lower foam density) and/or by optimizing the internal pressure and temperature of the closed-mold (lower pressure and higher temperature results in a lower foam density). Indeed, the dispersed phase may enhance the mechanical properties of the foam 101 by carrying part of applied loads (e.g., in tension, strain may be imparted to the dispersed phase in the foam such that the load is not carried entirely by the polymer matrix).

In some embodiments, a non-toxic (e.g., safe for human consumption, safe for human skin contact, not generally regarded as carcinogenic, or the like) plasticizer may be disposed in the polymer matrix of the foam 101 to impart a flexible character to the foam 101. Thus, the foam 101 may be deformed (e.g., compressed, bent, stretched, or the like) and return to its original form without breaking. In some embodiments, the non-toxic plasticizer may include low molecular weight polymers, polyols, alcohols, carbamide, or the like. In one embodiment, a polyol that is used as a plasticizer may be glycerol and a carbamide that may be used as a plasticizer may be urea. In some embodiments, the composition of the foam 101 further includes a plasticizer weight percent representative of the plasticizer included in the foam 101. In some embodiments, the plasticizer weight percent is greater than 0% but less than 1% (e.g., less than the alginate weight percent). In other embodiments, the plasticizer weight percent may range from 1% to 50% (e.g., the plasticizer weight percent may be less than the polymer matrix weight percent and the dispersed phase weight percent or the plasticizer weight percent may be greater than the polymer matrix weight percent and the dispersed phase weight percent). In some embodiments, the plasticizer weight percent may be greater than the alginate weight percent and the chitosan weight percent, but less than the dispersed phase weight percent. It is appreciated that the plasticizer weight percent may be tuned depending on the target flexibility of the foam 101. In the same or other embodiments, a dye or pigment may be added or otherwise included in the foam (e.g., added to precursor solutions that form the polymer matrix). It is appreciated that the dye (e.g., food colorings or other nontoxic dyes) or pigment (e.g., pigment powder) imparts a color (e.g., red, green, blue, yellow, orange, etc.) to the foam 101.

Figures 5A, 5B:
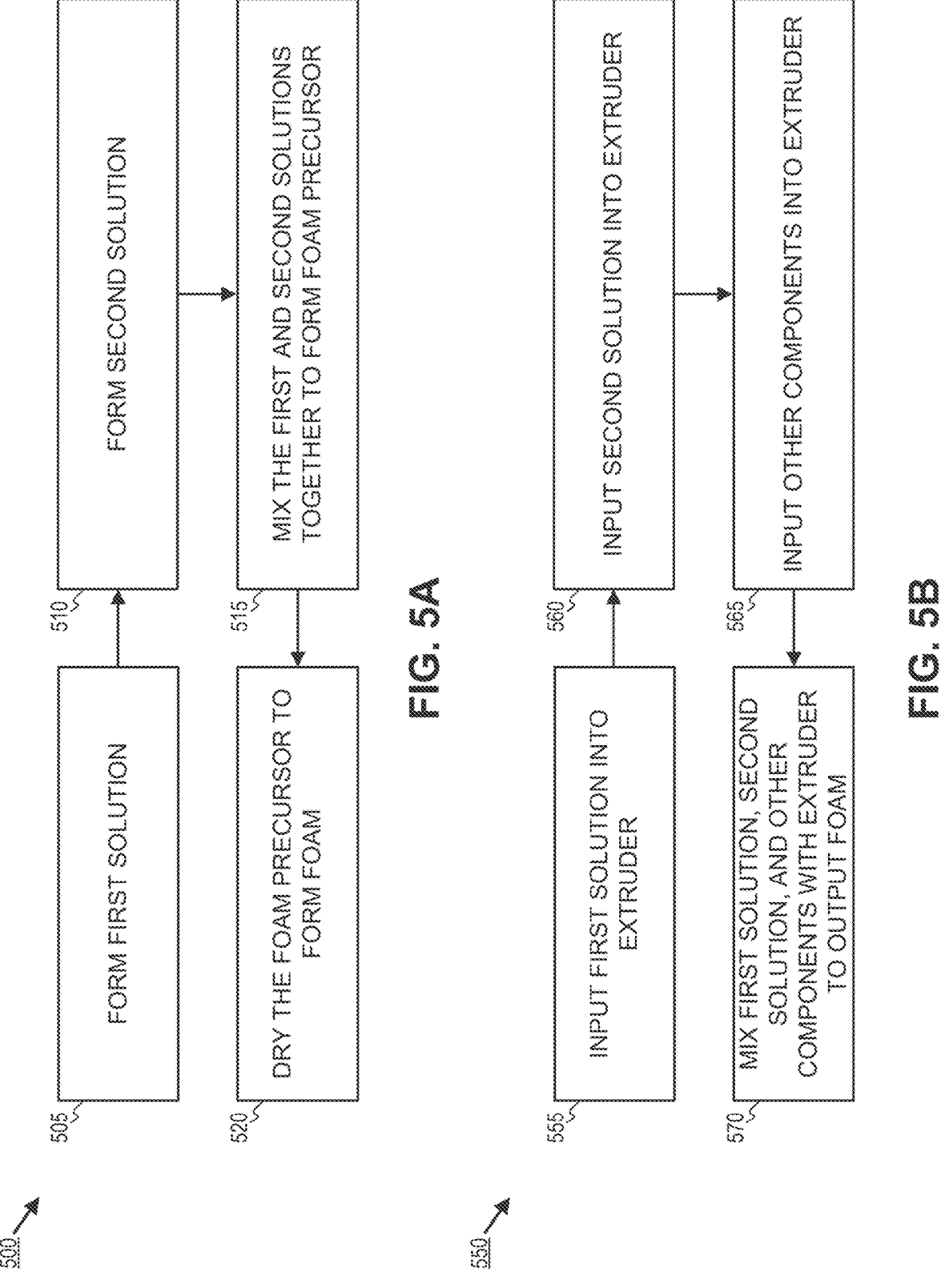
FIGS. 5A-5B illustrate example methods for foaming biodegradable foam with alginate, in accordance with embodiments of the present disclosure.

In some embodiments, the foam 101 may include a salt from reacted acid and base (e.g., when the first and second solutions are mixed as described further in FIG. 5A and FIG. 5B), which may be a sodium or calcium salt (e.g., sodium acetate, calcium acetate, calcium chloride, calcium carbonate, or the like). It is appreciated that the acid-base reaction may result in the generation of gas (e.g., $CO_2$), which may form the pores included in the foam 101. In some embodiments, the gas formed by the acid-base reaction may advantageously be used as the primary, or only, blowing agent for forming the foam 101.

Figure 2:
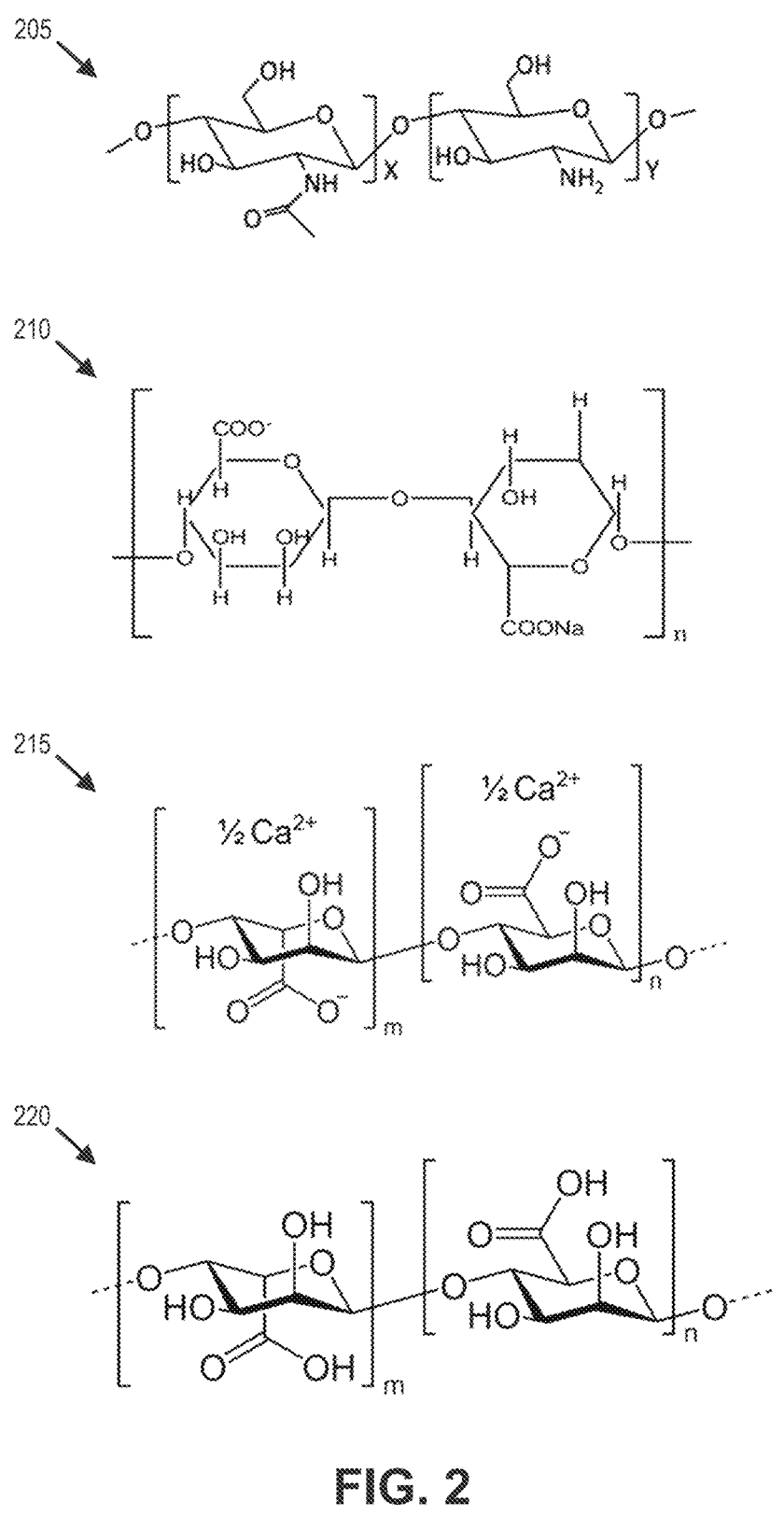

FIG. 2 illustrates chemical compositions of various ingredients that may be utilized to form a biodegradable foam, in accordance with embodiments of the present disclosure. The chemical compositions include structure 205 (e.g., chitosan or chitin depending on the relative amounts of blocks X and blocks Y), sodium alginate 210, calcium alginate 215, and alginic acid 220.

The structure 205 is representative of either chitin or chitosan depending on a degree of deacetylation. Specifically, the structure 205 may correspond to a monomer of a polymer that can be characterized as chitin or as chitosan depending on the relative amounts of blocks X (with acetyl group) and block Y (with amine group) in the chain (which may be used in the foam 101 of FIG. 1), in accordance with an embodiment of the disclosure. A majority of composition of chitin, for example, comprises blocks X while a majority of composition for chitosan comprises blocks Y. Chitin can be deacetylated by replacing the N-acetyl-glucosamine group with an N-glucosamine (Y block) resulting in a more hydrophilic and positively charged polymer, which can be described as partially deacetylated chitin. Alternatively, acetylation of chitosan can yield a partially acetylated chitosan. When the ratio between acetyl and amine groups is higher than 1:1 (e.g., X>Y such that there is greater than a 50%/50% split of the two monomer units), the partially deacetylated chitin polymer may be referred to as chitin, when the ratio is lower, the partially acetylated chitosan polymer may be referred to as chitosan. Put another way, chitosan has 50% or more N-glucosamine groups (e.g., Y blocks), whereas chitin has more than 50% N-acetyl-glucosamine groups (e.g., X blocks). Chitosan oligosaccharide has the same molecular structure as chitosan as described, just with a lower molecular weight (fewer monomer units) than the polymers of chitin or chitosan. In some embodiments, the degree of deacetylation for chitosan included in the foam 101 illustrated in FIG. 1 is greater than 60% (e.g., 60%-100% Y blocks of structure 205), greater than 70% (e.g., 70%-100% Y blocks of structure 205), or greater than 80% (e.g., 80%-100% Y blocks of structure 205).

It is appreciated that the relative concentrations of the acetyl and amine groups in a polymer can be measure, for example, using techniques described in Shigemasa, et al., "Evaluation of different absorbance ratios from infrared spectroscopy for analyzing the degree of deacetylation in chitin," International Journal of Biological Macromolecules 18 (1996) 237-242, which is incorporated by reference as if fully set forth herein. The presence of certain chemical groups in the foam (e.g., foam 101 illustrated in FIG. 1) can be measured by at least one of Fourier-transform infrared spectroscopy, Raman spectroscopy, nuclear magnetic resonance spectroscopy, or the like.

In addition to a polymer matrix formed by the structure 205, the foam (e.g., the foam 101 illustrated in FIG. 1), may include alginate in the form of sodium alginate 210, calcium alginate 215, and/or alginic acid 220. The benefit of including alginate is that the foam becomes more rigid, which leads to increased mechanical strength and reduced degradation. In addition, sodium alginate 210 is inherently antimicrobial, which may beneficially affect the foam by making it antimicrobial. Specifically, sodium alginate 210 has been shown to exhibit biocompatibility, non-toxicity, biodegradability and antimicrobial activity. This indicates that alginate (e.g., in the form of sodium alginate 210, calcium alginate 215, and/or alginic acid 220) can be used in the biodegradable foams described herein and the foams would remain biodegradable. It is appreciated that sodium alginate 210 and calcium alginate 215 are salts of alginic acid 220, which may be formed or otherwise included in the foam. Since calcium alginate 215 can have two bonds while sodium alginate 210 has one, the use of calcium alginate 215 may result in stronger alginate-alginate bonds, which may affect the mechanical properties of the foam.

Figure 3:
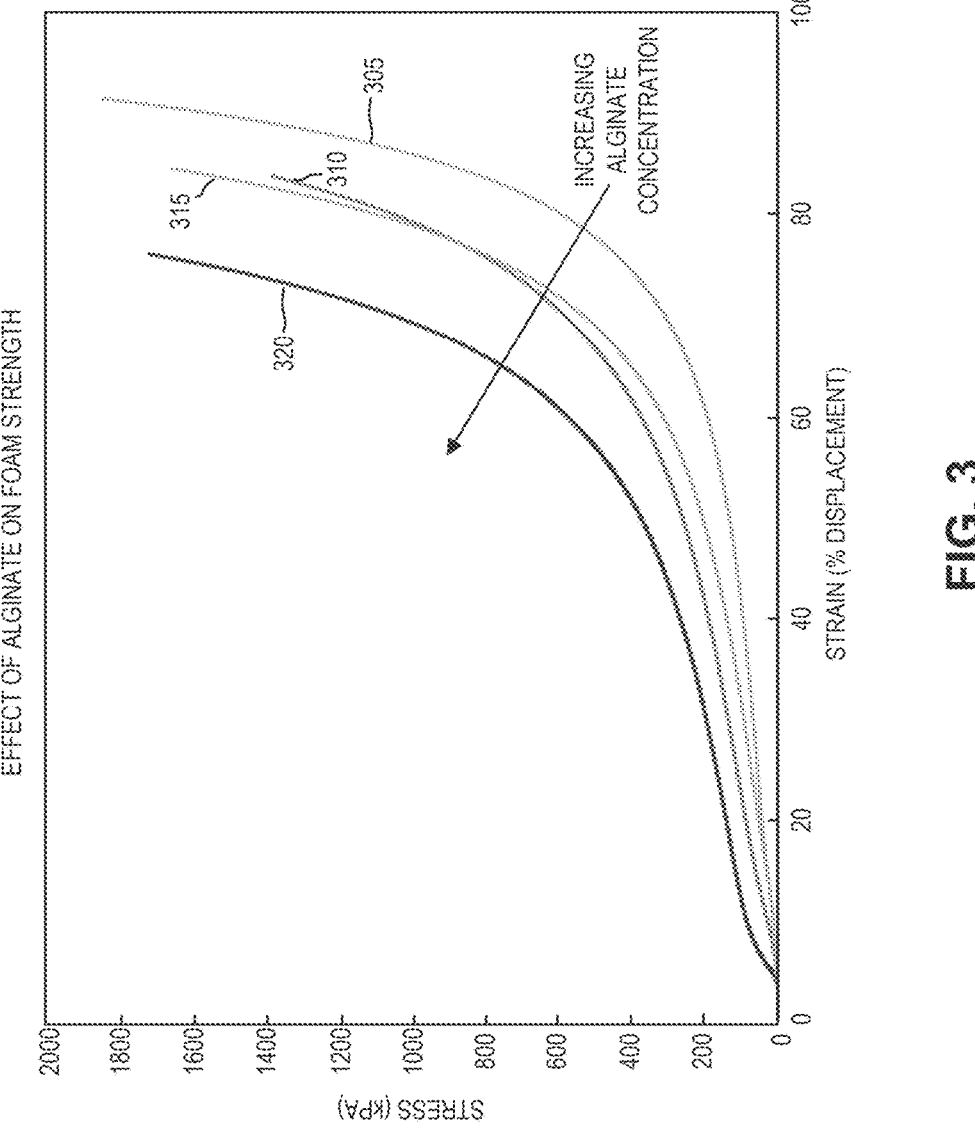
FIG. 3 illustrates example stress-strain curve data for biodegradable foams formed with varying amounts of alginate, in accordance with embodiments of the present disclosure.

FIG. 3 illustrates example stress-strain curve data for biodegradable foams (e.g., the foam 101 illustrated in FIG. 1) formed with varying amounts of alginate, in accordance with embodiments of the present disclosure. Curve 305 represents a control biodegradable foam with paper as a dispersed phase and no alginate. Curve 310 represents a biodegradable foam with paper as a dispersed phase and 0.25% alginate weight percent. Curve 315 represents a biodegradable foam with paper as a dispersed phase and 1.25% alginate weight percent. Curve 320 represents a biodegradable foam with paper as a dispersed phase and 5% alginate weight percent. As illustrated, the strength of the foam increases with increasing alginate concentration. Accordingly, the alginate weight percent may be tuned or otherwise adjusted to configure the foam to have targeted mechanical properties (e.g., increase weight percent of alginate to increase foam rigidity or strength). In some embodiments, the alginate corresponds to sodium alginate, calcium alginate, alginic acid, or other alginic acid derivatives or salts.

Figures 4A, 4B:
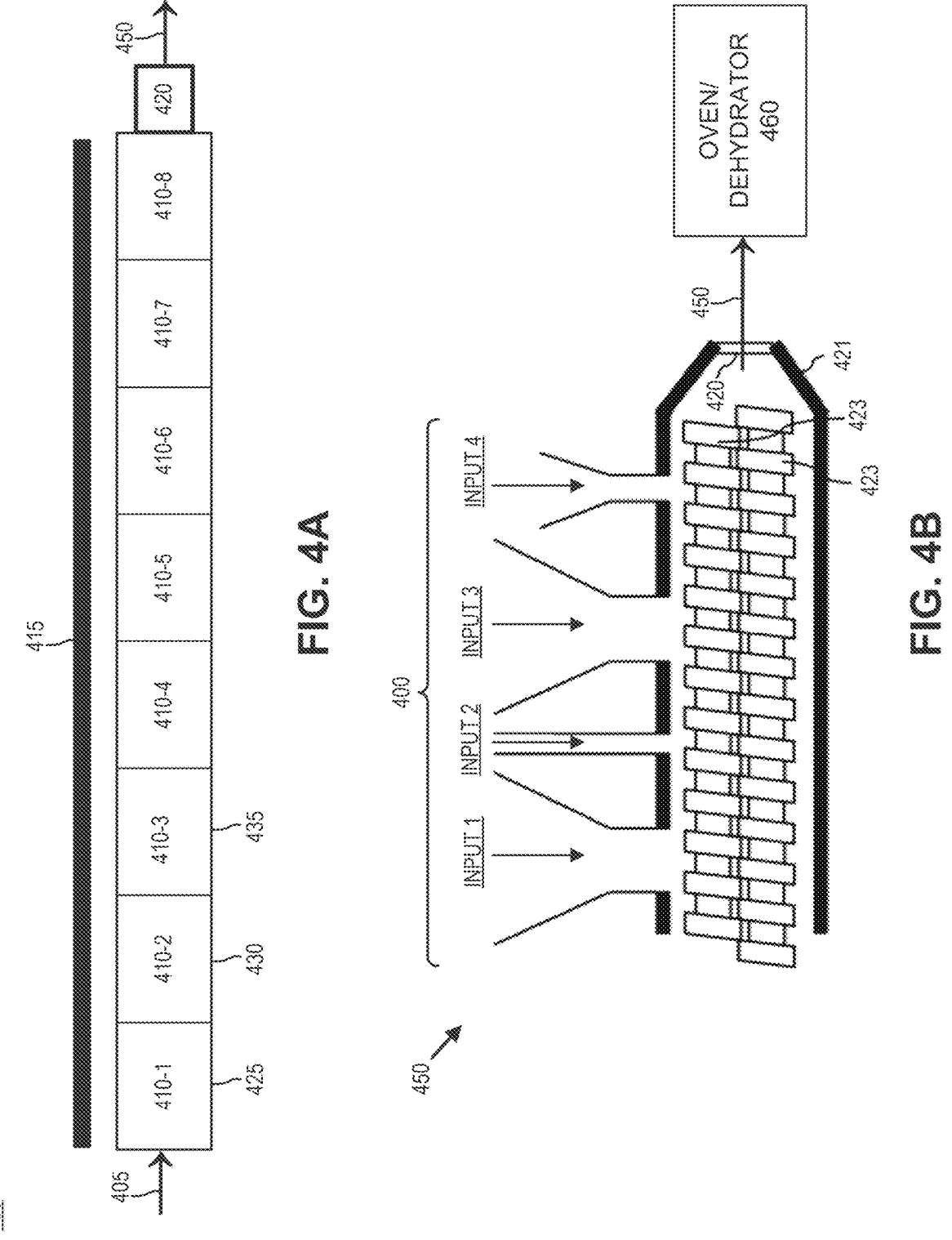
FIGS. 4A-4B illustrate example schematics for fabricating biodegradable foam using an extruder, in accordance with embodiments of the present disclosure.

FIGS. 4A-4B illustrate example schematics for fabricating biodegradable foam (e.g., the foam 101 illustrated in FIG. 1) using an extruder, in accordance with embodiments of the present disclosure.

FIG. 4A illustrates extruder 400, which includes a plurality of modules 410 (e.g., a first module 410-1, a second module 410-2, a third module 410-3, and so on). It is appreciated that the plurality of modules 410 are not intended to be limiting as there may be more or less modules than the illustrated eight modules (e.g., 410-1 through 410-8). Additionally, it is noted that while the plurality of modules 410 are arranged in sequential order, there may be additional modules between adjacent modules, in some embodiments. For example, in one embodiment there may be one or more modules included in the plurality of modules 410 between the second module 410-2 and the third module 410-3. In the illustrated embodiment, input ingredients 405 are input into the extruder 400 for forming the extrudate 450 (e.g., foam), which flow along the extruder 400 in the direction of the arrow 405 until the extrudate 450 is output. More specifically, the input ingredients for forming the extrudate 450 flows from a first end (e.g., proximate to the first module 410-1, the second module 410-2, and/or the third module 410-3) of the extruder 400 toward the second end of the extruder 400 (e.g., proximate to the extruder die 420 of the extruder 400) opposite the first end of the extruder 400. In some embodiments, the first module 410-1 is configured to provide a vent 425 to vent the extruder 400 at the first module 410-1 to atmosphere, the second module 410-2 is configured to input one or more solid feeds (e.g., solid components of the foam such as material forming the dispersed phase of the foam or any other solid component or ingredient of the foam) via port 430, and the third module 410-3 is configured to input one or more liquid feeds (e.g., liquid components to feed into the extruder 400 such as a first or second solution as described in relation to FIGS. 5A and 5B or any other liquid components or solutions used for forming the foam). In some embodiments, the second module 410-2 may be referred to as a solid input and the third module 410-3 may be referred to as a liquid input. As illustrated, the third module 410-3 is disposed between the second module 410-2 and the second end of the extruder 400 (i.e., the terminal end of the extruder 400 proximate to the extruder die 420). Additionally, the third module 410-3 is disposed between the first end and the second end of the extruder 400. It is appreciated that the one or more liquid feeds may be fed into the extruder 400 at the same location (e.g., one or more solutions fed at the same module location such as the third module 410-3 at the same or different times). In other embodiments, the one or more liquid feeds may be fed into the extruder 400 at different locations (e.g., the first solution is input at the third module 410-3 and the second solution is input at a later module such as the fourth module 410-4 at the same or different times).

In some embodiments, the extruder 400 may be a twin screw extruder and the barrel (e.g., the plurality of modules 410) of the extruder 400 may be heated between the first end and the second end (e.g., via heater 415). As illustrated, the mixture of components proceeded through the plurality of modules 410 may form the extrudate 450, which is passed through the extruder die 420 proximate to the second end of the extruder 400 to impart a cross sectional shape to the foam. However, it is appreciated that the extruder die 420 is an optional component and may be omitted in some embodiments such that the terminal end of the extruder 400 has no die or restriction through which the extrudate 450 passes.

FIG. 4B illustrates a system 450 which includes the extruder 400 illustrated in FIG. 4A and an oven/dehydrator 460 for forming a foam (e.g., the foam 101 illustrated in FIG. 1). Specifically, the illustrated embodiment of FIG. 4B, shows the extruder 400 as a twin screw extruder with screws 423 within a barrel 421 to output extrudate through the die 420. It is appreciated that in the illustrated embodiment, the modules are not individually labeled, but ports (e.g., inputs 1-4) leading to the screws 423 for inserting ingredients into the extruder 400 are shown, which may correspond to any of the ports (e.g., 425, 430, 435, or otherwise) illustrated in FIG. 4A.

In the illustrated embodiment of FIG. 4B, ingredients may be mixed in a continuous manner, and the foam may be produced in a continuous manner as an extrudate. For example, the different liquids and solids (i.e., ingredients for the foam) discussed herein may be input into the extruder 400 and foam with alginate may be pushed out the die 420 at the end of the extruder 400. In some embodiments, the extrudate 450 may correspond to foam and may not need further heating/dehydration. However, in other embodiments, the extrudate 450 may be inserted into an oven/dehydrator 460 for further processing (e.g., to remove residual moisture).

Extrusion is a continuous process where materials are fed into the extrusion machinery, and extrudate (e.g., the extruded material product) is pushed out of the system in desired shapes. An extruder has several parts: feeders (e.g., inputs 1-4), extruder barrel 421, extruder screws 423, extruder drive, and die 420. Polymers and solutions (including polymers and alginate) may be fed into the extruder with a controlled gravitational feeder or pumps. The polymers are then transported from the start of the system along the screws (optionally at an elevated temperature) within, and along the length of, the barrel. As the polymers are moved along the barrel, various additives and blowing agents can be added into the system, as needed. This continuous movement allows materials to mix well, forming a uniform viscous mixture, which then goes through the die 420 at the end/output of the extruder 400. Extrusion manufacturing is a high throughput process. Depending on the specific die design (e.g., the shapes and dimensions of the opening that the materials will be pushed out of), the final extrudate 450 can be in various forms (e.g., rolls, tubes, sheets, planks, and other customized shape profiles). Compared to batch processing, extrusion is less expensive, and the extrudate 450 has consistent properties since batch-to-batch variances are eliminated.

In the illustrated embodiment, there are a plurality of separate input feeds (e.g., gravitational feeders) for solids and liquids (e.g., inputs 1-4). In some embodiments, the liquid feeds are driven by a pump, while solid feeds may be driven by gravity. These inputs 1-4 may be disposed along a length of barrel 421 at various intervals (e.g., with locations corresponding to the various modules 410 illustrated in FIG. 4A). In one embodiment, input 1 is configured as a solid feed to receive at least one of chitosan, chitosan oligosaccharide, or chitin, input 2 is configured as a liquid feed to receive a first solution (e.g., an acidic solution including acetic acid or another acid where there is a 0.1-10% volume of acid to water), input 3 is configured as a solid feed to receive chitin, starch, cellulose, or other dispersed phase materials, and input 4 is configured as a liquid receive a second solution that includes alginate (e.g., an alkaline solution including sodium bicarbonate or calcium carbonate and alginate dissolved in water). It should be noted that depicted is a cartoon cross section of a twin screw extruder that is not drawn to scale; indeed, the relative distances between input feeds, and length of screws 423 may be distorted, as actual dimensions are not amenable to illustration.

As shown the ingredients (described elsewhere herein) may be put into the extruder 400 and mixed by the screws 423 of the extruder 400 to output an extrudate 450 corresponding to the foam. If necessary, the extrudate 450 may be input into an oven/dehydrator 460 for further processing (e.g., remove moisture or otherwise dry the foam). As depicted, the first solution (e.g., an acid solution including chitosan) and the second solution (e.g., a basic solution including alginate) may be input into the extruder 400 using the same or different feeds. Alternatively, the various ingredients may be mixed separately with the extruder 400.

FIGS. 5A-5B illustrate example methods 500 and 550 for foaming biodegradable foam with alginate, in accordance with embodiments of the present disclosure. It is appreciated that the methods 500 and 550 are possible methods for forming the foam 101 illustrated in FIG. 1 with a mold or extrusion system (e.g., extruder 400 illustrated in FIGS. 4A-4B). The example method 500 includes process blocks 505, 510, 515, and 520 while the example method 550 includes process blocks 555, 560, 565, and 570. It is appreciated that while the process blocks of the method 500 illustrated in FIG. 5A and method 550 illustrated in FIG. 5B are provided in a specific order, in other embodiments a different order of the process blocks may be utilized. Additionally, process blocks or steps may be added to, or removed from, the methods 500 and/or 550 in accordance with the embodiments of the present disclosure.

FIG. 5A illustrates method 500, which shows process blocks 505, 510, 515, and 520 to form a biodegradable foam with alginate, in accordance with embodiments of the present disclosure. It is appreciated that the illustrated steps of FIG. 5A enables one to make alginate-enhanced foam. One of skill in the art will appreciate that the steps may occur in any order and even in parallel. Additionally, steps may be added to or removed from the process in accordance with the teachings of the present disclosure.

Block 505 shows forming a first solution, which may be achieved by dissolving at least one of chitin, chitosan, or chitosan oligosaccharide in an acid. Specifically, the at least one of chitin, chitosan, or chitosan oligosaccharide may be dissolved or otherwise mixed in water and an acid (e.g., at least one of acetic acid, formic acid, lactic acid, hydrochloric acid, nitric acid, or sulfuric acid). In some embodiments, materials for a dispersed phase (e.g., at least one of chitin, starch, cellulose, shellfish shells, wood flour, hemp, paper pulp, coconut husks, cornstarch, pea starch, or tapioca powder) may be included in the first solution. However, it is appreciated that the materials for the dispersed phase may not necessarily be completely dissolved by the acidic environment of the first solution.

Block 510 illustrates forming a second solution, separate from the first solution, which may be achieved by dissolving alginate in an alkaline environment. Specifically, at least one of sodium alginate, calcium alginate, or alginic acid may be dissolved or otherwise mixed in water and a salt of a strong base (e.g., sodium bicarbonate, calcium carbonate, or the like). It is appreciated that between the first solution and the second solution, by weight, there may be more chitosan, chitosan oligosaccharide, or chitin than alginate. Similarly, by weight, there may be less chitosan, chitosan oligosaccharide, or chitin than materials for the dispersed phase.

Block 515 shows mixing the first solution and the second solution together to form a foam precursor. This may be achieved, for example by using a barrel mixer, an extrusion system (e.g., extruder 400 illustrated in FIGS. 4A-4B), or any other piece of equipment that allows for rapid and controlled mixing of the first and second solutions. When the first and second solutions are mixed, an acid-base reaction may occur that generates gas (e.g., $CO_2$), resultant from neutralization. In some embodiments, the generated gas may cause foaming and generate pores of the foam as the mixture is heated/dried and solidifies. Accordingly, in some embodiments, the density of the foam may be directly related to the amount of generated gas. In some embodiments, the generated gas may be supplemented by additional foaming agents (e.g., $CO_2$ or air introduced into the mixture).

Block 520 illustrates heating and drying the foam precursor to form the biodegradable foam with alginate. It has been found that alginate (e.g., sodium alginate) improves the mechanical properties of foams made from the materials described herein. The alginate solubilizes in alkaline solutions, which allows for it to be easily dissolved with sodium bicarbonate or other salts (e.g., calcium carbonate or the like) that are used to make the foam. When the form is foamed, a polymer matrix including at least one of chitin, chitosan, or chitosan oligosaccharide is formed. The foam includes alginate and may also include a dispersed phase disposed within or intermixed with the polymer matrix. In some embodiments, the foam may have a density of less than 1 g/cm³.

It is appreciated that ingredients of the foam for embodiments of the disclosure may be mixed in batches (e.g., a first solution that is acidic and a second solution that is alkaline). The solutions may then be mixed and poured together into a mold. The foam may then be hardened and desiccated (e.g., in an oven, and/or dehydrator) in the mold to produce the final dry foam part as shown by method 500 illustrated in FIG. 5A. The ratios of the various ingredients may be varied for different mechanical properties of the foam. In some embodiments, a ratio of 9:1, for chitin, chitosan, or chitosan oligosaccharide to alginate is used. However more or less alginate may be used, depending on the target mechanical properties of the foam. For example, in some embodiments, a ratio of chitin, chitosan, or chitosan oligosaccharide to sodium alginate four to one may be used.

In some embodiments, foam with alginate, including at least one of alginic acid, sodium alginate, calcium alginate or the like, is prepared by making first and second solutions. The first solution may be formed by dissolving nine parts chitosan in 5 liters of 0.175 M acetic acid (or other acid such as formic acid, lactic acid, hydrochloric acid, nitric acid, sulfuric acid, or the like). The second solution may be formed by dissolving one part sodium alginate (or other alginate) in 0.5 liters of 1.75 M sodium bicarbonate and water solution. In one embodiment, the first solution may correspond to a 96:4:1 weight percent solution of water to chitosan, to acetic acid, which includes 52.1 g of acetic acid, 208.5 g of chitosan, 5000 g of water, and 300 g of dispersed phase material mixed together. In the same embodiment, the second solution may correspond to a 20.8:3:1 weight percent solution of water to sodium bicarbonate to alginate, which includes 24 g of sodium alginate, 72.8 g of sodium bicarbonate, and 500 g of water. Procedurally, 1 part acetic acid and 4 parts chitosan are added to 96 parts water and mixed until all chitosan is dissolved to form the first solution. Similarly, 3 parts sodium bicarbonate is added to 20 parts hot water, which is then followed by 1 part sodium alginate that is added and blended to form the second solution. In some embodiments, 1.5 parts of materials for the dispersed phase are added to the first solution and fully incorporated. The second solution is then added to the first solution and mixed rapidly for one minute. The resultant mixture is then heated at 350° F. for an hour to catalyze the reaction and then dehydrated. In some embodiments, the mixture may correspond to a foam precursor that may be placed in a mold prior to heating to impart shape on the final foam product.

The benefit of this idea is a more rigid foam which leads to increased mechanical strength and reduced degradation. In addition, alginate is inherently antimicrobial, which may beneficially affect the foam by making it antimicrobial. The alginate has been shown to exhibit biocompatibility, non-toxicity, biodegradability and antimicrobial activity. This indicates that the alginate can be used in the biodegradable foams described herein and the foams would remain biodegradable.

FIG. 5B illustrates method 550, which shows process blocks 555, 560, 565, and 570 to form a biodegradable foam with alginate, in accordance with embodiments of the present disclosure. It is appreciated that the illustrated steps of FIG. 5B enables one to make alginate-enhanced foam. One of skill in the art will appreciate that the steps may occur in any order and even in parallel. Additionally, steps may be added to or removed from the process in accordance with the teachings of the present disclosure.

Block 555 shows inputting a first solution into an extruder (e.g., via one or more ports such as ports 425, 430, or 435 of the extruder 400 illustrated in FIG. 4B). As discussed previously, the first solution includes at least one of chitin, chitosan, or chitosan oligosaccharide may be dissolved in an acid solution (e.g., at least one of acetic acid, formic acid, lactic acid, hydrochloric acid, nitric acid, or sulfuric acid and water).

Block 560 illustrates inputting a second solution into the extruder (e.g., via one or more ports such as ports 425, 430, or 435 of the extruder 400 illustrated in FIG. 4B). As discussed previously, the second solution is an alkaline solution and includes alginate (e.g., at least one of alginic acid, sodium alginate, or calcium alginate) and may further include a salt of a strong base (e.g., sodium bicarbonate or calcium carbonate).

Block 565 illustrates input other components into the extruder (e.g., solid components via one or more ports such as ports 425, 430, or 435 of the extruder 400 illustrated in FIG. 4B). In some embodiments, the other components may include plasticizers (e.g., urea or glycerol), processing aids, lubricants (e.g., glycerol monostearate), and/or dispersed phase materials (e.g., at least one of shellfish shells, wood flour, hemp, paper pulp, coconut husks, cornstarch, pea starch, or tapioca powder).

In some embodiments, there may be more parts chitosan (or polymer matrix material) than alginate and less parts chitosan (or polymer matrix material) than dispersed phase input into the extruder, which directly affects the foam composition. Specifically, in one embodiment, there is more of the chitosan included in the first solution, by weight, relative to the alginate included in the second solution such that the foam has a composition that includes a chitosan weight percent representative of the chitosan included in the foam and an alginate weight percent representative of the alginate included in the foam. In the same or other embodiments, the chitosan weight percent is greater than the alginate weight percent. In some embodiments, a ratio of the alginate to the chitosan included in the foam ranges from 1 part alginate to 20 parts chitosan to one part alginate to 5 parts chitosan.

Block 570 illustrates mixing the first solution, the second solution, and other components of the foam with an extruder to form a mixture and then outputting an extrudate from the extruder corresponding to the foam (e.g., as illustrated in FIGS. 4A-4B).

Figure 6:
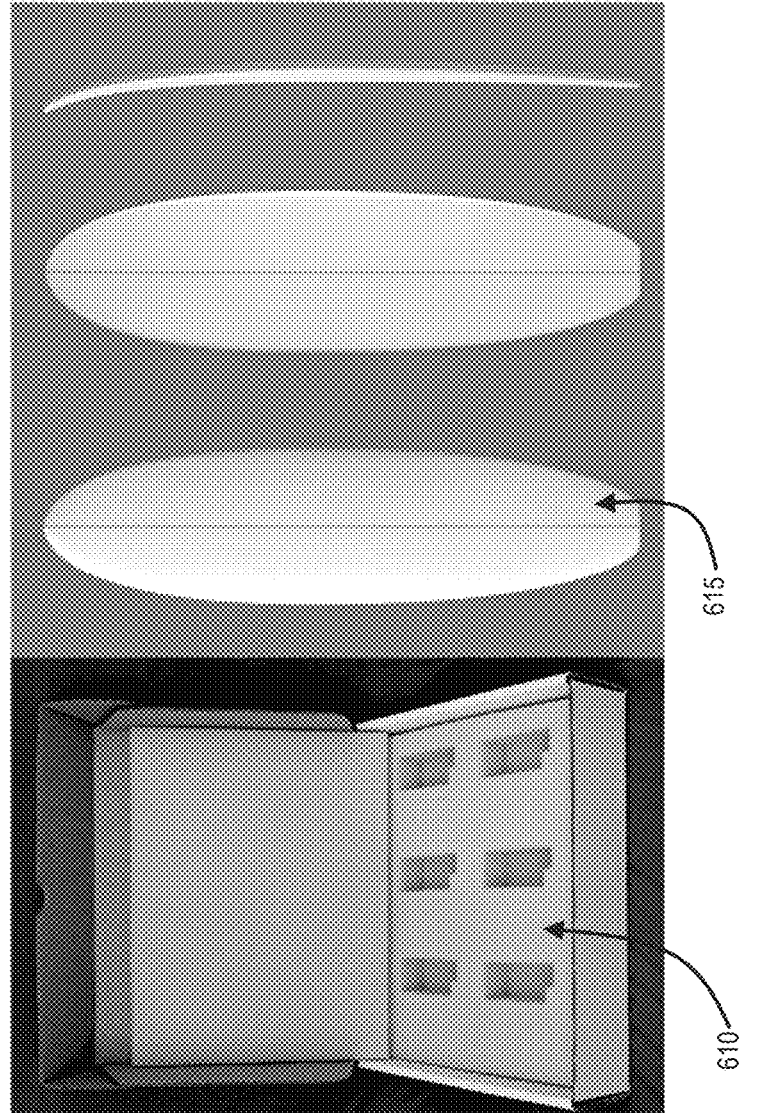
FIG. 6 illustrates example products with a three-dimensional shape formed of a biodegradable foam with alginate, in accordance with embodiments of the present disclosure.
Figure 6:
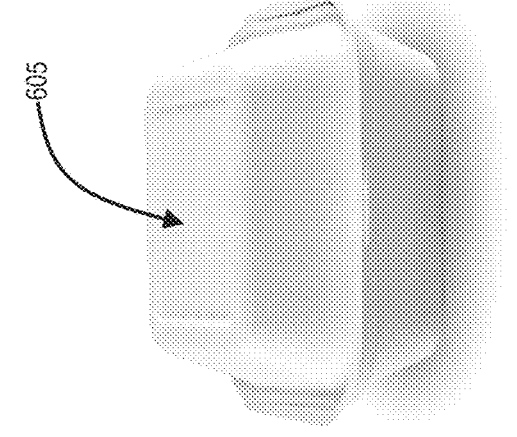

FIG. 6 illustrates example products with a three-dimensional shape produced with the biodegradable foam that includes alginate, in accordance with embodiments of the present disclosure. As illustrated, the products formed from the biodegradable foam with alginate (e.g., the foam 101 illustrated in FIG. 1) may correspond to food packaging 605 (e.g., a clamshell packaging), electronics packaging 610 (e.g., a foam cut to hold cell phones), or sporting equipment 615 (e.g., a surfboard blank).

The above description of illustrated embodiments of the invention, including what is described in the Abstract, is not intended to be exhaustive or to limit the invention to the precise forms disclosed. While specific embodiments of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

12

What is claimed is:

1. A foam, comprising:
   a polymer matrix including at least one of chitin, chitosan, or chitosan oligosaccharide, wherein the polymer matrix is porous; and
   alginate disposed in the foam, wherein the foam has a density of less than 1 g/cm³, wherein:
   (i) a chitosan weight percent representative of the chitosan included in the foam is greater than an alginate weight percent representative of the alginate included in the foam; or
   (ii) a chitin weight percent representative of the chitin included in the foam is greater than the alginate weight percent.

2. The foam of claim 1, wherein the alginate includes at least one of alginic acid, sodium alginate, or calcium alginate.

3. The foam of claim 1, further comprising a salt disposed in the foam, and wherein the salt includes a sodium salt or a calcium salt.

4. The foam of claim 1, further comprising a dispersed phase disposed within the polymer matrix, wherein the dispersed phase includes at least one of chitin, starch, cellulose, shellfish shells, wood flour, hemp, paper pulp, coconut husks, cornstarch, pea starch, or tapioca powder.

5. The foam of claim 1, wherein a ratio of the alginate to the chitosan included in the foam ranges from 1 part alginate to 20 parts chitosan to one part alginate to 5 parts chitosan.

6. The foam of claim 1, wherein the chitosan weight percent is less than a dispersed phase weight percent representative of a dispersed phase included in the foam.

7. A method of making foam, comprising:
   dissolving at least one of chitin, chitosan, or chitosan oligosaccharide in a first solution;
   dissolving alginate in a second solution, separate from the first solution, wherein the second solution is alkaline; and
   mixing the first solution and the second solution together to form a foam precursor; and
   drying the foam precursor to form the foam, wherein the foam comprises a polymer matrix including at least one of the chitin, the chitosan, or the chitosan oligosaccharide, wherein the polymer matrix is porous, wherein the foam further comprises alginate, wherein the foam has a density of less than 1 g/cm³, and wherein:
   (i) a chitosan weight percent representative of the chitosan included in the foam is greater than an alginate weight percent representative of the alginate included in the foam; or
   (ii) a chitin weight percent representative of the chitin included in the foam is greater than the alginate weight percent.

8. The method of claim 7, wherein the first solution is acidic that includes at least one of acetic acid, formic acid, lactic acid, hydrochloric acid, nitric acid, or sulfuric acid, wherein the second solution includes sodium bicarbonate or calcium carbonate, and wherein the mixing the first solution and the second solution together produces a gas, and wherein the gas produces pores in the foam.

9. The method of claim 7, further comprising mixing a dispersed phase material into at least one of the first solution or the second solution, wherein the dispersed phase material includes at least one of chitin, starch, cellulose, shellfish shells, wood flour, hemp, paper pulp, coconut husks, cornstarch, pea starch, or tapioca powder.

10. The method of claim 7, wherein there is more of the chitosan included in the first solution, by weight, relative to the alginate included in the second solution, wherein a ratio of the alginate to the chitosan included in the foam ranges from 1 part alginate to 20 parts chitosan to one part alginate to 5 parts chitosan.

11. A method of producing foam, comprising:

inputting a first solution into an extruder, wherein the first solution includes at least one of chitin, chitosan, or chitosan oligosaccharide;

inputting a second solution into the extruder, wherein the second solution includes alginate;

inputting a plasticizer into the extruder, and outputting a foam from the extruder as an extrudate, wherein the foam includes the alginate, the plasticizer, and least one of the chitin, the chitosan, or the chitosan oligosaccharide, wherein the foam comprises a polymer matrix including at least one of the chitin, the chitosan, or the chitosan oligosaccharide, wherein the polymer matrix is porous, wherein the foam further comprises the alginate and the plasticizer, wherein a weight percent of the plasticizer for the foam is greater than a weight percent of the alginate for the foam, and wherein the foam has a density of less than 1 g/cm$^3$.

12. The method of claim 11, wherein there is more of the chitosan included in the first solution, by weight, relative to the alginate included in the second solution such that a chitosan weight percent representative of the chitosan included in the foam is greater than an alginate weight percent representative of the alginate included in the foam.

13. The method of claim 12, wherein a ratio of the alginate to the chitosan included in the foam ranges from 1 part alginate to 20 parts chitosan to one part alginate to 5 parts chitosan.

14. The method of claim 11, adjusting a quantity of the alginate included in the second solution to control a strength of the foam.

15. A foam, comprising:

a polymer matrix including at least one of chitin, chitosan, or chitosan oligosaccharide, wherein the polymer matrix is porous;

alginate disposed in the foam, wherein the foam has a density of less than 1 g/cm$^3$; and a dispersed phase disposed within the polymer matrix, wherein a weight percent of the polymer matrix is less than a weight percent of the dispersed phase.

16. The foam of claim 15, wherein a weight percent of the polymer matrix is between 0.5-3 times that of a weight percent of the dispersed phase.

17. A foam, comprising:

a polymer matrix including at least one of chitin, chitosan, or chitosan oligosaccharide, wherein the polymer matrix is porous;

alginate disposed in the foam, wherein the foam has a density of less than 1 g/cm$^3$; and a plasticizer, and wherein a weight percent of the plasticizer is greater than a weight percent of the alginate.

18. The foam of claim 17, wherein the plasticizer includes at least one of a polyol or a carbamide.

19. The foam of claim 17, further comprising a dispersed phase disposed within the polymer matrix, wherein the weight percent of the plasticizer is greater than a weight percent of the chitosan, and wherein the weight percent of the plasticizer is less than a weight percent of the dispersed phase.

* * * * *